US012681890B2

(12) United States Patent
Peyrard

(10) Patent No.: US 12,681,890 B2
(45) Date of Patent: Jul. 14, 2026

(54) DATA TRANSMISSION ON I2C BUS

(71) Applicant: STMicroelectronics (Grenoble 2) SAS, Grenoble (FR)

(72) Inventor: Rene Peyrard, Voiron (FR)

(73) Assignee: STMicroeletronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 17/312,239

(22) PCT Filed: Feb. 13, 2020

(86) PCT No.: PCT/FR2020/050261
§ 371 (c)(1),
(2) Date: Jun. 9, 2021

(87) PCT Pub. No.: WO2020/169902
PCT Pub. Date: Aug. 27, 2020

(65) Prior Publication Data
US 2022/0027303 A1 Jan. 27, 2022

(30) Foreign Application Priority Data

Feb. 22, 2019 (FR) ....................................... 1901844

(51) Int. Cl.
*G06F 13/42* (2006.01)
*H04L 1/00* (2006.01)
*H04L 12/40* (2006.01)
(52) U.S. Cl.
CPC .......... *G06F 13/4282* (2013.01); *H04L 1/004* (2013.01); *H04L 12/40* (2013.01); *G06F 2213/0016* (2013.01)

(58) Field of Classification Search
None
See application file for complete search history.

(56) References Cited

U.S. PATENT DOCUMENTS

| | | | | | |
|---|---|---|---|---|---|
| 6,505,320 | B1 * | 1/2003 | Turk | .................. | G11B 20/1833 341/59 |
| 7,023,848 | B2 * | 4/2006 | Yehuda | ..................... | H04J 3/14 370/411 |
| 8,385,374 | B1 * | 2/2013 | Wohlgemuth | .......... | H04L 25/14 370/464 |
| 8,948,209 | B2 * | 2/2015 | Tailliet | ................ | G06F 13/4291 710/110 |
| 9,454,504 | B2 * | 9/2016 | Evans | ................. | G06F 13/4291 |
| 10,839,809 | B1 * | 11/2020 | Jha | ........................... | H04L 65/70 |
| 2004/0100946 | A1 * | 5/2004 | Schriel | .................... | H04L 25/14 370/366 |

(Continued)

FOREIGN PATENT DOCUMENTS

| | | |
|---|---|---|
| CN | 106170781 A | 11/2016 |
| FR | 2939926 A1 | 6/2010 |

(Continued)

*Primary Examiner* — Henry Tsai
*Assistant Examiner* — Dean Phan
(74) *Attorney, Agent, or Firm* — Slater Matsil, LLP

(57) ABSTRACT

In an embodiment, a method of transmission over an I2C bus includes: transmitting first data over a first channel of a data signal of the I2C bus; and transmitting second data over a second channel of the data signal, wherein the first data and the second data are linked to each other.

22 Claims, 4 Drawing Sheets

(56) References Cited

U.S. PATENT DOCUMENTS

| 2013/0272580 | A1* | 10/2013 | Karel | G06K 19/06046 |
| | | | | 235/487 |
| 2013/0325820 | A1* | 12/2013 | Grube | G06F 11/076 |
| | | | | 707/691 |
| 2015/0046627 | A1* | 2/2015 | Tailliet | G06F 13/4291 |
| | | | | 710/314 |
| 2015/0121074 | A1* | 4/2015 | Devanand | H04L 9/08 |
| | | | | 713/168 |
| 2015/0286606 | A1 | 10/2015 | Sengoku | |
| 2015/0286608 | A1* | 10/2015 | Sengoku | G06F 13/4291 |
| | | | | 710/313 |
| 2016/0378580 | A1 | 12/2016 | Ries et al. | |
| 2019/0129875 | A1* | 5/2019 | Chard | G06F 13/4291 |
| 2019/0220436 | A1* | 7/2019 | Pitigoi-Aron | H04L 5/0046 |
| 2019/0335379 | A1* | 10/2019 | Joseph | H04W 40/246 |

FOREIGN PATENT DOCUMENTS

| FR | 3009633 | A1 | 2/2015 |
| FR | 3038188 | A1 | 12/2016 |

* cited by examiner

DATA TRANSMISSION ON I2C BUS

CROSS-REFERENCE TO RELATED APPLICATIONS

This patent application is a national phase filing under section 371 of PCT/FR2020/050261, filed Feb. 13, 2020, which claims the priority benefit of French Patent Application No. 1901844 filed on Feb. 22, 2019, all of which applications are hereby incorporated herein by reference in their entireties.

TECHNICAL FIELD

The present disclosure generally concerns electronic circuits and, more specifically, systems where a plurality of circuits are capable of communicating over an I2C bus.

BACKGROUND

The I2C protocol uses, in addition to a reference signal (generally, the ground) representing one of the two states of the binary signals, a data signal (SDA) and a clock or synchronization signal (SCL).

The I2C protocol is used to communicate between a master device or circuit, which generates the synchronization signal over a clock line as well as the data signal over a data line, and a slave device or circuit which responds on the data signal. The slave device (receiver) generates an acknowledgement bit that it transmits over the data line. In practice, the bus conductors are, in the idle state, at a potential different from the reference potential, the second potential representing the other one of the two states of the binary signals.

SUMMARY

It would be desirable to take advantage of the presence of an I2C bus to allow the authentication of accessories or of consumables by equipment.

An embodiment overcomes all or part of the disadvantages of known authentication processes.

An embodiment provides a method of transmission over an I2C bus, wherein a first channel of the data signal conveys first data and a second channel of the same data signal conveys second data, the two pieces of data being linked to each other.

An embodiment provides a circuit of communication over an I2C bus, comprising circuits capable of implementing the described method.

An embodiment provides a computer program product, comprising a non-transient storage support comprising instructions adapted to implementing the described method.

An embodiment provides a memory circuit containing a lookup table between a set of first data and a set of second data.

According to an embodiment, the second data depend on the first data.

According to an embodiment, the second data represent the application of a correction code to the first data.

According to an embodiment, the second data are a mask.

According to an embodiment, the second data are identical to the first data.

According to an embodiment, in transmit mode, a transmit function is applied to transmit data:

the first data corresponding to the transmit data or to the result of the application of the transmit function to the transmit data; and the second data corresponding to the transmit data, or to the result of the application of the transmit function to the transmit data or to a mask applied to the transmit data to obtain the first data.

According to an embodiment, a transmitter transmits the transmit data via the first data, the second data representing information of verification or of correction of the first data by a receiver.

According to an embodiment, a transmitter masks the transmit data and then transmits the result via the first data, the second data representing information of unmasking of the first data by a receiver.

According to an embodiment, in receive mode, a receive function is applied to the first and second data and supplies receive data, the receive data corresponding to the first data or to the result of the application of the receive function.

According to an embodiment, information representative of the receive data is returned to a transmit circuit.

An embodiment provides a system of transmission over an I2C bus comprising at least two devices, at least one of the devices:

being capable of implementing the described method; and/or comprising a communication circuit such as described; and/or comprising a program product such as described; and/or comprising a memory circuit such as described.

An embodiment provides a transmitter of such a system.

An embodiment provides a receiver of such a system.

An embodiment provides a transceiver of such a system.

The foregoing and other features and advantages will be discussed in detail in the following non-limiting description of specific embodiments in connection with the accompanying drawings.

DETAILED DESCRIPTION OF THE ILLUSTRATIVE EMBODIMENTS

Figure 1:
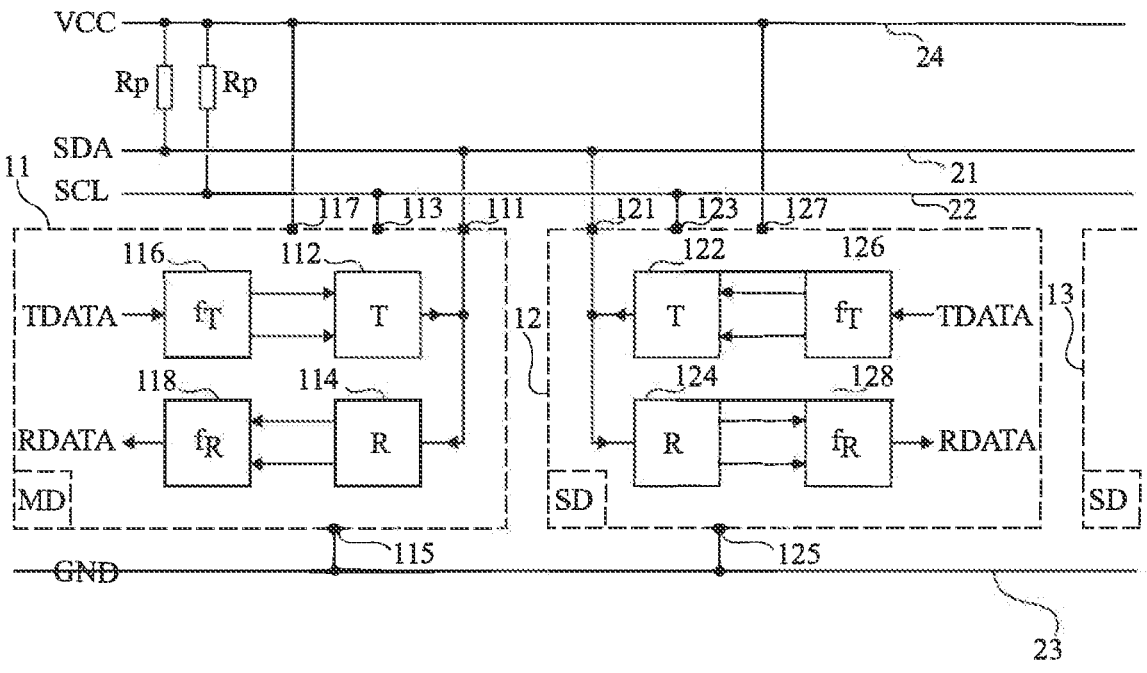
FIG. 1 very schematically shows in the form of blocks an embodiment of a system using an I2C bus to transmit linked data.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the generation of the signals according to the data to be transmitted over an I2C bus and the reception of these signals by a reception circuit have not been detailed, the described embodiments being compatible with usual transmissions between two or a plurality of circuits over an I2C bus.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

Unless specified otherwise, the expressions "around", "approximately", "substantially" and "in the order of" signify within 10%, and preferably within 5%.

FIG. 1 very schematically shows in the form of blocks an embodiment of a system using an I2C bus to transmit linked data.

An I2C bus is formed of two wires or conductors 21 and 22 intended to convey, respectively, a data signal SDA and a synchronization signal SCL.

A plurality of circuits 11, 12, 13 are coupled, preferably connected, to wire 21 (terminals 111, 121) of transmission of data signal SDA, to wire 22 (terminals 113, 123) of transmission of synchronization or clock signal SCL, and to a wire or conductor 23 (terminals 115, 125) taken to a reference electric potential (typically, ground G). Circuits 11, 12, 13 and other circuits connected to bus I2C or belonging to the same electronic circuit may be powered under a same voltage or under different voltages. For example, circuits 11, 12, and 13 are connected to a wire or conductor 24 (terminals 117, 127) taken to an electric potential VCC higher than that of ground GND. Wires 21 and 22 are individually coupled by pull-up resistors Rp to wire 24, so that signals SDA and SCL are idle in the high state.

For a transmission over the I2C bus, one of the circuits (for example, circuit 11), is used as a master device (MD) and imposes synchronization signal SCL. The other circuit (s) 12 and 13 then have the status of slave devices (SD) to receive the data transmitted by circuit 11 and respond to circuit 11. These data may be directed towards a plurality of slave circuits or towards a single one of them. The I2C protocol provides transmitting a device address before a data byte. According to the communication direction, a same circuit may now have a master status, now a slave status.

According to an embodiment, for a transmission of linked data over the I2C bus, circuits 11 and 12 contain transmit blocks 112 and 122 (T) as well as receive blocks 114 and 124 (R) respectively used to send and to receive data via wire SDA. Each transmit block 112, 122 receives from a functional transmit block 116 or 126 ($f_T$) two pieces of information to be transmitted over wire SDA. Each block 116, 126 transforms transmit data TDATA to be transmitted over the I2C bus into two linked pieces of data. Further, each receive block 114, 124 coupled, preferably connected, to wire SDA, comprises two outputs coupled to a functional receive block 118 or 128 ($f_R$) enabling to restore data RDATA from the two linked data received over the I2C bus. Circuit 13 and the possible other slave circuits (not shown) also contain blocks and connections similar to those of previously-described circuits 11 and 12. Functional blocks 116, 126, 118, 128 are not necessarily identical from one circuit to the other.

According to specific embodiments, functional blocks 116, 126, 118, 128 may be in hardware and/or software form and be indifferently formed of circuits, of software, or of memories (devices directly storing all the possible results originating from the application of the function $f_T$ or $f_R$ implemented by the corresponding block 116, 126, or 118, 128).

Figure 2:
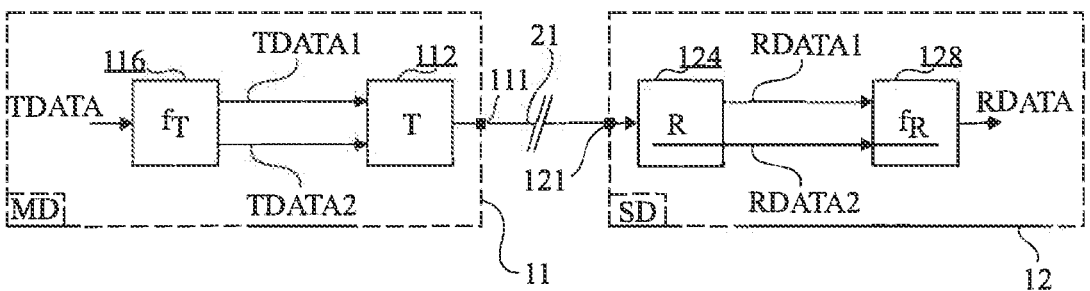
FIG. 2 is block diagram of another system of transmission/reception of linked data over an I2C bus.

FIG. 2 is a block diagram of a system of transmission/reception of linked data over an I2C bus.

Only the elements of master circuit 11 dedicated to data transmission and the elements of slave circuit 12 dedicated to data reception are shown, the two circuit portions being connected together by wire or conductor 21 of the I2C bus. To simplify the representation of FIG. 2, only part of the elements forming the circuit driving wire 21 has been shown. The other components of the master device and of the slave device are usual, particularly the elements generating the synchronization signal SCL imposed, by circuit 11, to terminal 113 connected to wire 22.

Data to be transmitted TDATA are first sent onto an input of functional block 116 of circuit 11 for an application of function $f_T$. This results in two correlated (or linked) pieces of data TDATA1 and TDATA2 which are then transmitted back over wire 21 by transmit block 112 of circuit 11. This is similar to a transmission of two temporally distinct channels on signal SDA, a first channel conveying data TDATA1 and a second channel conveying data TDATA2.

From terminal 121 coupled to wire 21, the receive block 124 of circuit 12 then enables to obtain as an output two pieces of data RDATA1 and RDATA2 originating from the two channels used for the transmission. Finally, the functional block 128 of circuit 12 processes data RDATA1 and RDATA2 to obtain as an output a single piece of data RDATA.

Figure 3:
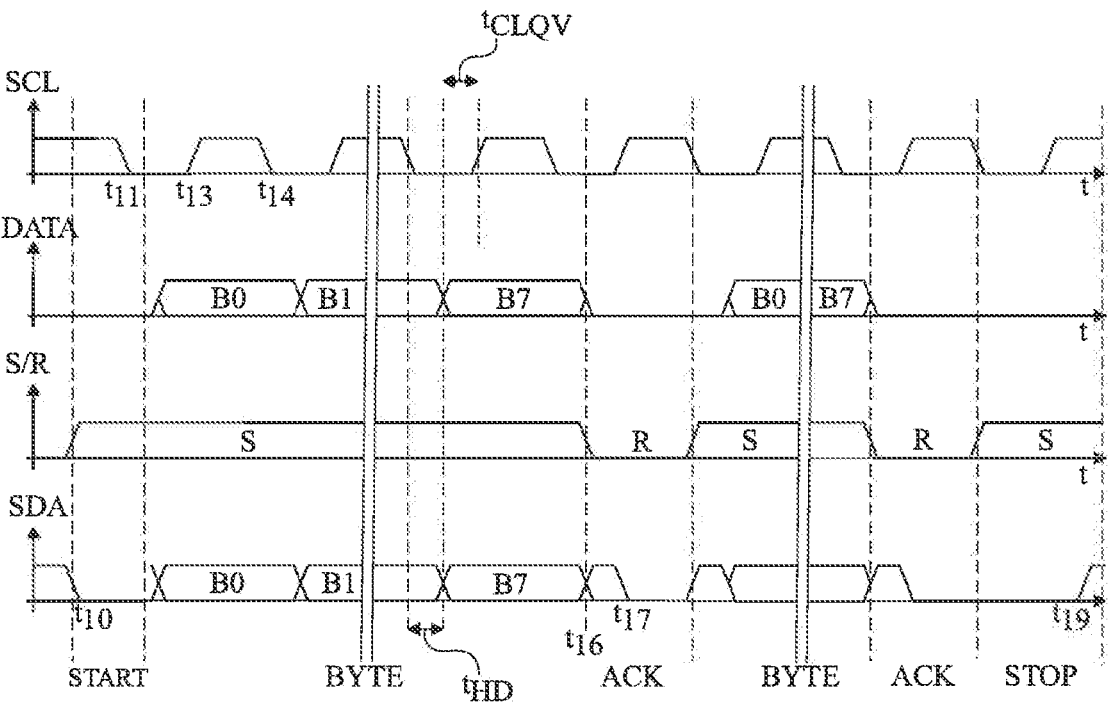
FIG. 3 shows timing diagrams illustrating the operation of the I2C bus.

FIG. 3 shows timing diagrams illustrating the operation of the I2C bus.

The timing diagrams of FIG. 3 illustrate an example of shapes of signal SCL, of a data signal DATA to be transmitted by a master device to one or a plurality of slave devices, of a signal S/R internal to the master device, and of signal SDA. Signal S/R symbolizes the phases during which the master circuit is in transmit mode (S) and imposes the state of signal SDA and the phases during which it is in receive mode (R) and detects the state of signal SDA. In the example of FIG. 3, a periodic synchronization signal of duty cycle ½ is considered, which is not necessary.

The I2C protocol defines a communication start bit (START) by a switching to the low state (time $t_{10}$) of signal SDA while signal SCL remains in the high state. The switching is caused by that of the devices which takes the master status for the communication. The master device then switches signal SCL to the low level (time $t_{11}$). Then, it imposes the state of signal SDA according to the state of the first bit Bo of the byte (BYTE) to be transmitted. The state of signal SDA is validated by the period (time $t_{13}$ to time $t_{14}$) in the high state of signal SCL. When signal SCL returns to the low state, the master circuit continues the operation with the next bits B1, . . . B7, until transmission of the full byte.

At the end of the last bit B7 (time $t_{16}$) of the first byte, the master device releases signal SDA, which thus returns to the high state, and positions its terminal 111 coupled to wire 21 in a mode of reading of the state of signal SDA (signal S/R in low state R).

The different slave circuits detect the beginning of a communication by monitoring the respective states of signals SCL and SDA. When signal SDA is pulled to the low state (time $t_{10}$) while signal SCL remains in the high state, the slave devices know that a transmission will start.

Most often, the first byte sent by the master device comprises seven address bits identifying the addressee circuit, followed by a bit indicating the operation (reading/writing) desired by the master device.

The different slave circuits detect the transmitted data and, in particular, determine from the first byte forming the addressee's address whether the next byte(s) are intended for them.

At the end of the first byte, the slave circuit, identified by the address, acknowledges (ACK) the transmitted byte by pulling signal SDA to the low state. Such a transition (time $t_{17}$) is detected by the master circuit which can then transmit the next byte and so on, until the end of the transmission. For such a transmission of the next byte(s), the master circuit switches back the state of its port coupled to wire 21 to impose this state (signal S/R in high state S).

Once the last data bit has been transmitted and an acknowledgement ACK has been received from the slave circuit, the master circuit imposes a stop condition (STOP) by switching signal SDA to the high state (time $t_{19}$) while signal SCL is itself in the high state.

Figure 4:
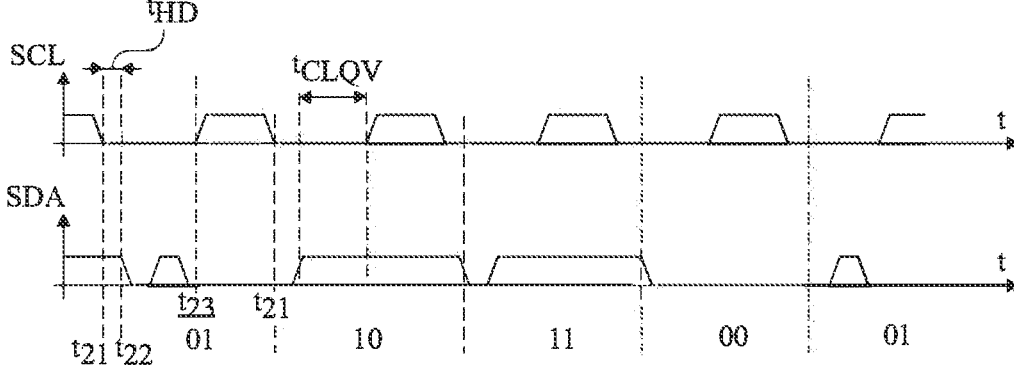
FIG. 4 shows timing diagrams illustrating a multichannel transmission over an I2C bus.

FIG. 4 shows timing diagrams illustrating a multichannel transmission over an I2C bus.

The timing diagrams of FIG. 4 illustrate an example of shapes of signals SCL and SDA imposed by a master circuit. In the example of FIG. 4, signal SCL has been arbitrarily shown with a duty cycle different from ½.

FIG. 4 illustrates four examples 01, 10, 11, 00 of possible combinations between, on the one hand, the signal (state 1 or 0) of the main channel intended to convey data TDATA1 and, on the other hand, the signal (state 1 or 0) of the secondary channel intended to convey linked data TDATA2 over the I2C bus. The data of the secondary channel are coded in the form of a pulse signal generated outside of the period (high state of signal SLC—time $t_{23}$ to time $t_{21}$) of validation of the main data signal.

The I2C protocol provides time windows from the falling edge of synchronization signal SCL. Typically, a duration $t_{HD}$ (of approximately 200 ns for a 400-kHz protocol) sets a minimum interval between the falling edge of signal SCL (time $t_{21}$) and the appearing of the coding of the next data, and a maximum duration $t_{CLQV}$ (approximately 700-900 ns in the above example) between the presentation of the data (time $t_{22}$) and the next rising edge (time $t_{23}$) of signal SCL. The minimum duration of the low stages of signal SCL is also set: it is approximately 1.3 µs for a 400-kHz protocol (and approximately 4.7 µs for a 100-kHz protocol). The interval (time $t_{22}$ to time $t_{23}$) between the appearing of the coding and the rising edge of signal SCL leaves a free interval in the I2C protocol. The secondary channel (TDATA2) is coded during periods when synchronization signal SCL is in the low state (having respected duration $t_{HD}$). In the shown example, if a pulse (succession of a low state and then of a high state) is present, this corresponds to transmitting a state 1 over the secondary channel. However, if no pulse is present, this corresponds to transmitting a state 0 over the secondary channel.

Advantage is then taken of the existence of an unexploited period in the I2C bus. Typically, in an I2C protocol with a 400-kHz frequency, a period of 700-900 ns separates time $t_{22}$ from time $t_{23}$ (duration for which the state of signal SDA is not taken into account by the receivers of the I2C protocol). This period is taken advantage of for the pulse transmission of the secondary channel used to convey linked data TDATA2. The duration of the pulse is in the range from 300 ns to 500 ns for a 400 kHz protocol (and from 1.0 µs to 2.2 µs for a 100-kHz protocol).

The slave circuits are capable of detecting such pulse signals.

Figure 5:
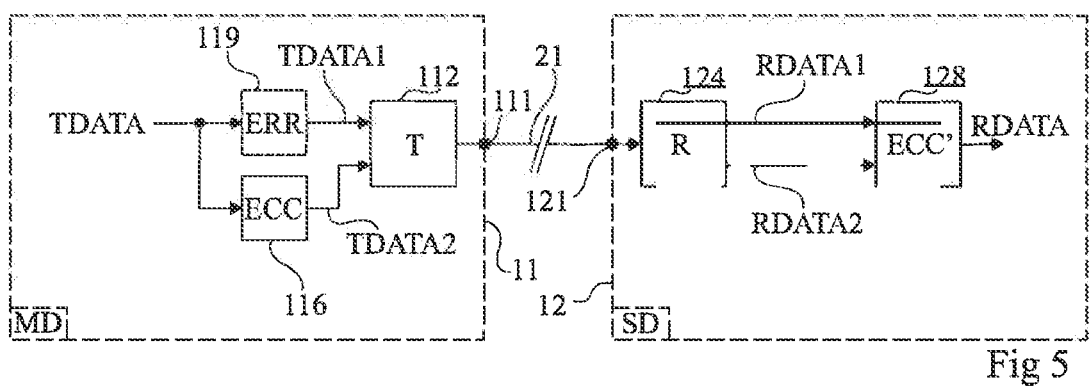
FIG. 5 is a block diagram of an embodiment of a data transceiver system using an error correction mechanism (ECC)

FIG. 5 is a block diagram of an embodiment of a data transceiver system using an error correction mechanism (ECC).

According to this embodiment, block 116 (ECC) applies an error correction code (function $f_T$ is an error correction code) to data to be transmitted TDATA. The result of the application of the code to data TDATA forms data TDATA2.

According to an embodiment, data TDATA directly form data TDATA1.

According to another preferred embodiment, circuit 11 comprises a block 119 (ERR) which applies an error function to data TDATA to provide intentionally erroneous data TDATA1. The number of bits of data TDATA1 altered by error function ERR is selected to be in the range of bit numbers correctable by the error correction code.

Block 112 of circuit 11 transmits to block 124 of circuit 12 two pieces of data: on the one hand, TDATA2 and on the other hand, TDATA1, which represents, in the absence of optional block 119, data TDATA to be transmitted or, in the presence of optional block 119, the erroneous data.

The two pieces of data RDATA1 and RDATA2 obtained at the output of block 124 of circuit 12 are processed by block 128 (ECC'). The result of the processing provides data RDATA. In the shown example, it is assumed that block 128 applies to the received data RDATA1 an error correction code ECC' corresponding to code ECC, by using data RDATA2. In other words, function $f_R$ is an error correction code.

According to an embodiment (in the case where circuit 11 comprises no block 119), block 128 corrects possible errors in the received data RDATA1 with respect to the transmitted data TDATA1 and then guarantees that data RDATA correspond to data TDATA.

According to another embodiment where an error is introduced into data TDATA1 by block 119, the application of error correction code ECC' by block 128 corrects the erroneous data, altered by block 119, to restore data RDATA corresponding to data TDATA. Thus, block 128 corrects data RDATA1 by means of data RDATA2. According to this embodiment, the correction by receive circuit 12, of the error intentionally introduced by transmit circuit 11 means that the receive circuit 12 effectively has the function of data reception and processing on two channels and the error correction function.

It may then be provided for receive circuit 12 to send back the data RDATA obtained by block 128. If the data thus received in return by circuit 11 are identical to the data TDATA transmitted by circuit 11, this then means that circuit 12 effectively implements the function of data reception and processing on two channels and the error correction function. Circuit 12 then reproduces the functionalities of the described embodiment.

If, however, the receive circuit does not have the function of data reception and processing on two channels and the error correction function, the verification by transmit circuit 11 of the data RDATA received by the receive circuit shows receive data RDATA different from the transmitted data TDATA. Circuit 12 then does not reproduce the functionalities of the described embodiment.

According to another embodiment, data TDATA2 represent the result of the application of an encryption function, for example, a signature, to data TDATA (function $f_T$ is a signature calculation function). Data RDATA1 are then equal to data TDATA and are transmitted with a signature carried by data TDATA2. On the receive side, circuit 11 decodes the received signal and, if it comprises the functionalities of this embodiment, is capable of processing the data of the two channels RDATA1 and RDATA2, and of verifying that a signature that it calculates (it then owns a function $f_R$ applying the same signature calculation algorithm as function $f_T$ of circuit 11) corresponds to the signature received on data RDATA2. Assuming a response mechanism according to which transmitter circuit 11 waits for an acknowledgement representative of the signature obtained by the receiver, the fact for circuit 12 to return the acknowledgement then means that circuit 12 reproduces the functionalities of the described embodiment.

According to still another embodiment, data TDATA1 and TDATA2 are identical and correspond to data TDATA. Function $f_T$ then is a function of duplication of data TDATA. On the receive side, function $f_R$ is for example a function of XOR type bit-to-bit combination, the expected result of which is a null word (all bits at state 0). The detection of the fact that a slave circuit has the functionalities of this embodiment may be performed by an exchange process according to which the master circuit waits in return for the result of function $f_R$. If it receives a null word, this means that circuit 12 reproduces the functionalities of the described embodiment.

According to still an embodiment, data RDATA2 form a mask that the receiver circuit is assumed to apply to the data RDATA1 that it receives to return an expected result.

Data TDATA2, the generation of which by block 116 aims at enabling to verify or to correct data RDATA1 received by circuit 12, may possibly comprise a number of bits smaller than the number of bits of data TDATA. In the case of an error correction code, the length of the code conditions the number of bits capable of being corrected.

Figure 6:
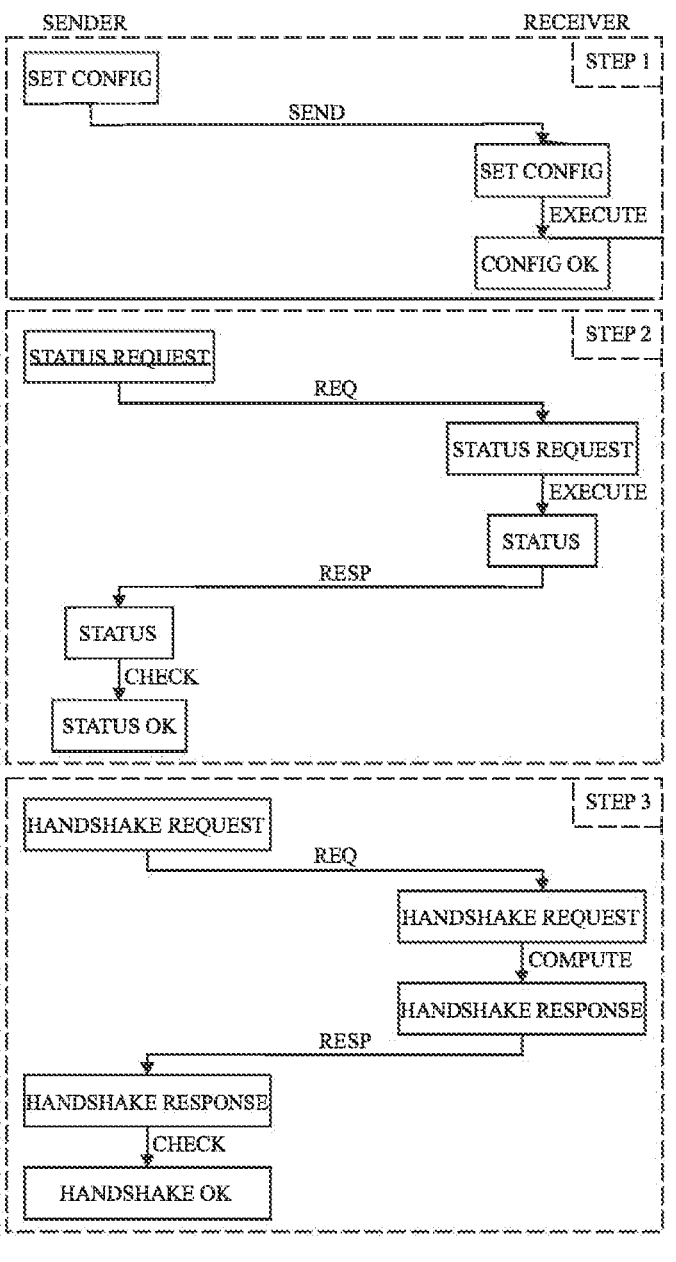
FIG. 6 is a flow diagram of operations associated with the implementation of an error correction mechanism between a transmitter and a receiver.

FIG. 6 is a flow diagram of operations associated with the implementation of an error correction principle between a transmitter and a receiver.

The above-described operations typically aim at checking that a receiver is capable of using a multichannel transmission and of correcting possible errors affecting the data sent by a transmitter.

In a first step (STEP 1), the transmitter (SENDER) sends (SEND) to the receiver (RECEIVER) a control signal (SET CONFIG) for configuring the communication. The taking into account (EXECUTE) of the control signal by the receiver enables it to be informed that the transmission over the I2C bus will be performed over two channels and that the error correction function should be active (CONFIG ON).

In a second step (STEP 2), the transmitter interrogates (REQ) the receiver with a status request (STATUS REQUEST). The taking into account (EXECUTE) of the request by the receiver enables it to send (RESP) a status (STATUS) to the transmitter. The checking (CHECK) of the status by the transmitter enables to verify that the transmission is properly established (STATUS OK).

In a third step (STEP 3), the transmitter interrogates (REQ) the receiver with a handshake request (HANDSHAKE REQUEST). The handshake request is preferably generated by introducing an intentional error in the data to be transmitted as discussed in relation with FIG. 5. In the case where the receiver is provided with the blocks necessary to multichannel communication and error correction, the taking into account (EXECUTE) of the request by the receiver enables it to send back (RESP) the response (HANDSHAKE RESPONSE) expected by the transmitter. The checking (CHECK) of the response by the transmitter enables to verify whether the receiver is capable of implementing the error correction function (HANDSHAKE OK).

Figure 7:
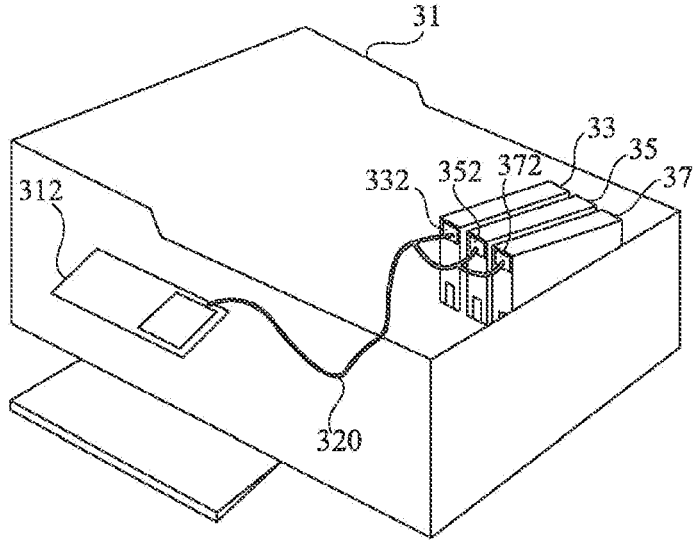
FIG. 7 illustrates an example of connection between an electronic circuit associated with a printer and electronic circuits associated with ink cartridges.

FIG. 7 illustrates an example of connection between the electronic circuit of a printer and electronic circuits associated with ink cartridges.

In the example of FIG. 7, a printer 31 contains a main circuit 312 dedicated, in particular, to driving electromechanical components. Printer 31 is equipped with one or a plurality of ink cartridges, for example, three ink cartridges 33, 35, and 37. Each cartridge 33, 35, 37 supports a circuit, respectively 332, 352, and 372. The four circuits 312, 332, 352, and 372 are coupled together by conductors, symbolized by a cable 320, compatible with a transmission respecting the I2C protocol. Preferably, circuit 312 of printer 31 plays the role of a master circuit while circuits 332, 352, and 372 play the role of slave circuits. In this case, the two-channel transmission may be provided in the master-to-slave direction only, the responses of the cartridges implementing a usual I2C transmission and the specific functions $f_T$ and $f_R$ being then only respectively provided on the printer side and on the cartridge side.

Figure 8:
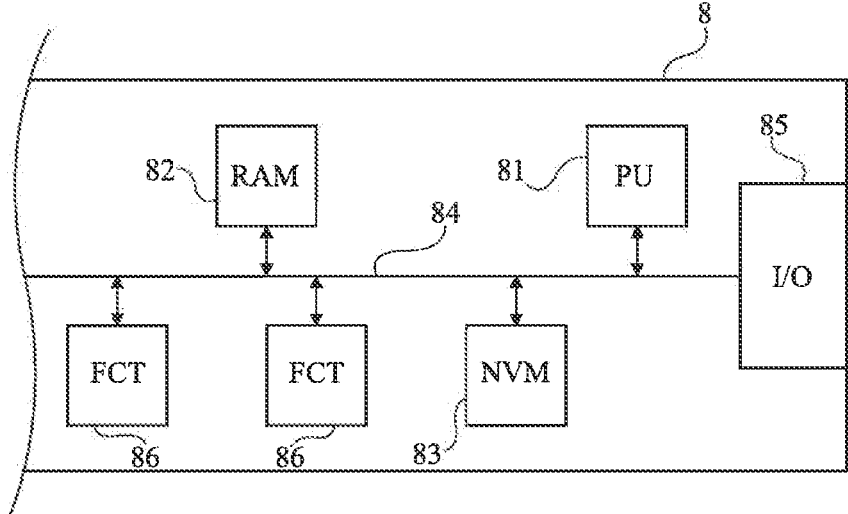
FIG. 8 very schematically shows in the form of blocks an embodiment of an electronic circuit capable of implementing the described embodiments.

FIG. 8 very schematically shows in the form of blocks an embodiment of an electronic circuit 8 capable of implementing the described embodiments.

Electronic circuit 8 comprises:
one or a plurality of digital processing units (PU) 81, for example, of state machine, microprocessor, programmable logic circuit type, etc.; and/or
one or a plurality of memories of volatile storage (RAM) 82, 83 and/or non-volatile storage (NVM) of data and programs;
one or a plurality of data, address, and/or control buses 84 between the different elements internal to circuit 8; and
one or a plurality of input/output interfaces (I/O) 85 of communication, among others, over an I2C bus with the outside of the circuit; and
various other circuits according to the application, symbolized in FIG. 8 by block 86 (FCT).

Assuming an implementation of function $f_R$ by circuits 8 equipping cartridges, it may be provided for the actual function $f_R$ not to be contained in the circuit but for a memory, preferably a non-volatile memory, thereof to contain a lookup table between sets of data RDATA1 and RDATA2 reproducing function $f_T$ for all or part of the possible values. This then enables the cartridge to implement the described method.

In the context of a partial or total software implementation, a storage support of the concerned device or equipment may store instructions of a computer program product which, when they are implemented by a processor equipping the device or the equipment, results in that the processor implements all or part of the described method.

Various embodiments and variations have been described. Those skilled in the art will understand that certain features of these various embodiments and variations may be combined, and other variations will occur to those skilled in the art. In particular, what is more particularly discussed in relation with an example of application to a printer-cartridge authentication more generally applies to any accessory or consumable authentication by a piece of equipment.

Finally, the practical implementation of the described embodiments and variations is within the abilities of those skilled in the art based on the functional indications given hereabove. In particular, in the error correction embodiment, the selection of the length and of the nature of the error correction code may vary according to the application. Further, although the described embodiments more particularly refer to a system where the master (printer) and slave (cartridge) functions are set, the transposition of the described embodiments to a system where all circuits may play a master or slave role (FIG. 1) is within the abilities of those skilled in the art based on the above description.

The invention claimed is:

1. A method of transmission over an I2C bus having a data line and a clock line, the method comprising:
applying a transmit function to transmit data to generate a first data and a second data, wherein the first data comprises the transmit data having an intentional error introduced therein and wherein the second data comprises error correction data derived from the transmit data;
transmitting, to a receiver, the first data over a first channel of the data line of the I2C bus;
transmitting, to the receiver, the second data over a second channel of the data line of the I2C bus, the second channel being temporally distinct from the first channel;
receiving, from the receiver, information representative of data recovered from the first data and the second data; and
authenticating the receiver based on whether the received information indicates that the receiver applied a receive function to the first data and the second data, the receive function being related to the transmit function.

2. The method of claim 1, wherein transmitting the second data over the second channel comprises encoding the second data as a pulse signal generated during a low phase of a clock signal (SCL) carried on the clock line of the I2C bus, the second data being transmitted outside a validation period of the first data.

3. The method of claim 1, wherein the intentional error is introduced such that a receiver possessing the receive function can recover the transmit data but a receiver lacking the receive function cannot.

4. The method of claim 3, wherein the intentional error introduced into the first data comprises a number of bit errors within a correctable range of the error correction data.

5. The method of claim 1, wherein applying the transmit function comprises:
applying an error function to the transmit data to generate the first data having the intentional error; and
applying an error correction code to the transmit data to generate the second data, wherein a number of bits altered by the error function is within a correction capacity of the error correction code.

6. The method of claim 1, further comprising:
prior to transmitting the first data and the second data, transmitting a configuration signal to the receiver indicating that transmission will occur over two temporally distinct channels of the data line with error correction enabled; and
receiving a status response from the receiver confirming readiness to receive dual-channel transmission.

7. The method of claim 1 wherein the second data has fewer bits than the transmit data.

8. The method of claim 1, further comprising:
receiving the first data by the receiver;
receiving the second data by the receiver; and
applying, by the receiver, the receive function to the received first and second data.

9. The method of claim 8, wherein applying the receive function comprises transforming the received first and second data into receive data corresponding to the transmit data and wherein the information related to the first data and the second data comprises the receive data.

10. A method of transmission over an I2C bus having a data line and a clock line, the method comprising:
receiving, by a receiver, a configuration signal from a transmitter indicating that subsequent transmission will occur over two temporally distinct channels of the data line of the I2C bus with error correction enabled;
transmitting, by the receiver, a status response to the transmitter confirming readiness to receive dual-channel transmission;
receiving, by the receiver, first data over a first channel of the data line of the I2C bus, wherein the first data comprises transmit data having an intentional error introduced therein;
receiving, by the receiver, second data over a second channel of the data line of the I2C bus, the second channel being temporally distinct from the first channel, wherein the second data comprises error correction data derived from the transmit data;
applying, by the receiver, a receive function to the first data and the second data to recover the transmit data, the receive function being related to a transmit function applied by the transmitter to generate the first data and the second data; and
transmitting, by the receiver, a handshake response to the transmitter, the handshake response comprising information representative of the recovered transmit data, whereby the transmitter can authenticate the receiver based on the handshake response.

11. The method of claim 10, wherein receiving the second data over the second channel comprises detecting a pulse signal generated during a low phase of a clock signal (SCL) carried on the clock line of the I2C bus, the pulse signal being present outside a validation period of the first data.

12. The method of claim 10, wherein applying the receive function comprises:
applying an error correction code to the first data using the second data to identify and correct bits altered by the intentional error; and
recovering the transmit data from the corrected bits, wherein a number of bits corrected is within a correction capacity of the error correction code.

13. The method of claim 10, wherein the second data has fewer bits than the transmit data.

14. A system comprising:
an I2C bus having a data line and a clock line;
a transmitter coupled to the I2C bus, wherein the transmitter is configured to apply a transmit function to transmit data to generate a first data and a second data, wherein the first data comprises the transmit data having an intentional error introduced therein and wherein the second data comprises error correction data derived from the transmit data, the first data and the second data being linked to each other by the transmit function; and a receiver coupled to the I2C bus, wherein the receiver is configured to apply a receive function to received first data and second data to recover the transmit data by correcting the intentional error using the second data, the receive function being complementary to the transmit function;

wherein the transmitter and the receiver are configured to communicate such that:

the transmitter transmits, to the receiver, the first data over a first channel of the data line of the I2C bus and transmits the second data over a second channel of the data line of the I2C bus, the second channel being temporally distinct from the first channel; and the receiver transmits, to the transmitter, a handshake response comprising information representative of data recovered by the receiver from the first data and the second data so that the transmitter authenticates the receiver by determining that the handshake response demonstrates successful application of the receive function to the first and second data.

15. The system of claim 14, wherein the transmitter is configured to authenticate the receiver by determining that the handshake response demonstrates successful recovery of the transmit data from the first data having the intentional error, whereby successful recovery is only achievable by application of the receive function that is complementary to the transmit function.

16. The system of claim 14, further comprising a memory circuit that comprises a lookup table between a set of first data and a set of second data.

17. The system of claim 14, wherein the transmitter comprises circuitry of a printer and the receiver comprises circuitry of a cartridge.

18. An apparatus comprising:

an error introduction circuit configured to apply an error function to transmit data to generate first data having an intentional error introduced therein, wherein a number of bits altered by the error function is within a correction capacity of an error correction code;

an error correction circuit configured to apply the error correction code to the transmit data to generate second data comprising error correction data derived from the transmit data, the first data and the second data being linked to each other such that a receiver possessing a receive function complementary to the error correction code can recover the transmit data from the first data using the second data;

a transmit circuit configured to transmit the first data over a first channel of a data line of an I2C bus and transmit the second data over a second channel of the data line of the I2C bus, the second channel being temporally distinct from the first channel;

a receive circuit configured to receive a handshake response comprising information representative of data recovered from the first data and the second data; and an authentication circuit configured to perform authentication of a receiver providing the handshake response by determining whether the handshake response demonstrates successful recovery of the transmit data from the first data having the intentional error, whereby successful recovery is only achievable by application of the receive function complementary to the error correction code.

19. The apparatus of claim 18, wherein the authentication circuit is configured to authenticate the receiver providing the handshake response by determining that the handshake response demonstrates successful recovery of the transmit data.

20. The apparatus of claim 18, wherein the transmit circuit is further configured to transmit, prior to transmitting the first and second data, a configuration signal indicating that subsequent transmission will occur over two temporally distinct channels of the data line of the I2C bus.

21. The apparatus of claim 18, wherein the transmit circuit is further configured to encode the second data as a pulse signal generated during a low phase of a clock signal (SCL) of the I2C bus, the pulse signal being transmitted outside a validation period of the first data.

22. The apparatus of claim 18, wherein the error introduction circuit and the error correction circuit are configured to operate in parallel on the same transmit data such that the error introduction circuit applies the error function to the transmit data to generate the first data independently of the error correction circuit and the error correction circuit applies the error correction code to the transmit data to generate the second data independently of the error introduction circuit, wherein the first data and the second data are generated from a common input without sequential dependency.

* * * * *